United States Patent [19]

Przewalski

[11] Patent Number: 4,700,638
[45] Date of Patent: Oct. 20, 1987

[54] METHOD AND APPARATUS FOR SOIL DETOXIFICATION

[75] Inventor: Zygmunt J. Przewalski, Granby, Conn.

[73] Assignee: M & S Engineering and Manufacturing Co., Inc., Broad Brook, Conn.

[21] Appl. No.: 895,138

[22] Filed: Aug. 11, 1986

[51] Int. Cl.[4] .............................. F23G 7/00
[52] U.S. Cl. ................... 110/346; 110/236; 110/237; 110/246; 241/DIG. 10
[58] Field of Search ............... 110/236, 237, 229, 246, 110/346; 241/DIG. 10

[56] References Cited

U.S. PATENT DOCUMENTS

| | | | |
|---|---|---|---|
| 3,807,321 | 4/1974 | Stockman | 110/236 |
| 3,848,548 | 11/1974 | Bolejack, Jr. et al. | 110/237 |
| 4,032,361 | 6/1977 | Eriksson et al. | 110/236 X |
| 4,361,100 | 11/1982 | Hinger | 110/229 X |
| 4,417,528 | 11/1983 | Vining et al. | 110/229 |
| 4,429,642 | 2/1984 | Deve | 110/236 |

Primary Examiner—Edward G. Favors
Attorney, Agent, or Firm—Hayes & Reinsmith

[57] ABSTRACT

A method and apparatus for detoxifying soil particles containing low melting point mineral compounds contaminated with combustible toxic materials wherein the soil particles are located without melting the low melting point mineral compounds to form combusted solids and a mixture of mineral dust and toxic material containing gas, the combusted solids are separated from the dust-gas mixture, the dust gas mixture is thereafter separated into the mineral dust and the toxic material-containing gas, and the toxic material-containing gas is then combusted at high temperature to form less harmful combustion products. The low melting point mineral compounds may be those mineral compounds of oxygen, silicon, calcium, iron and aluminum, and certain metal and metal oxides. The combustible toxic materials may be dioxin and PCB.

7 Claims, 1 Drawing Figure

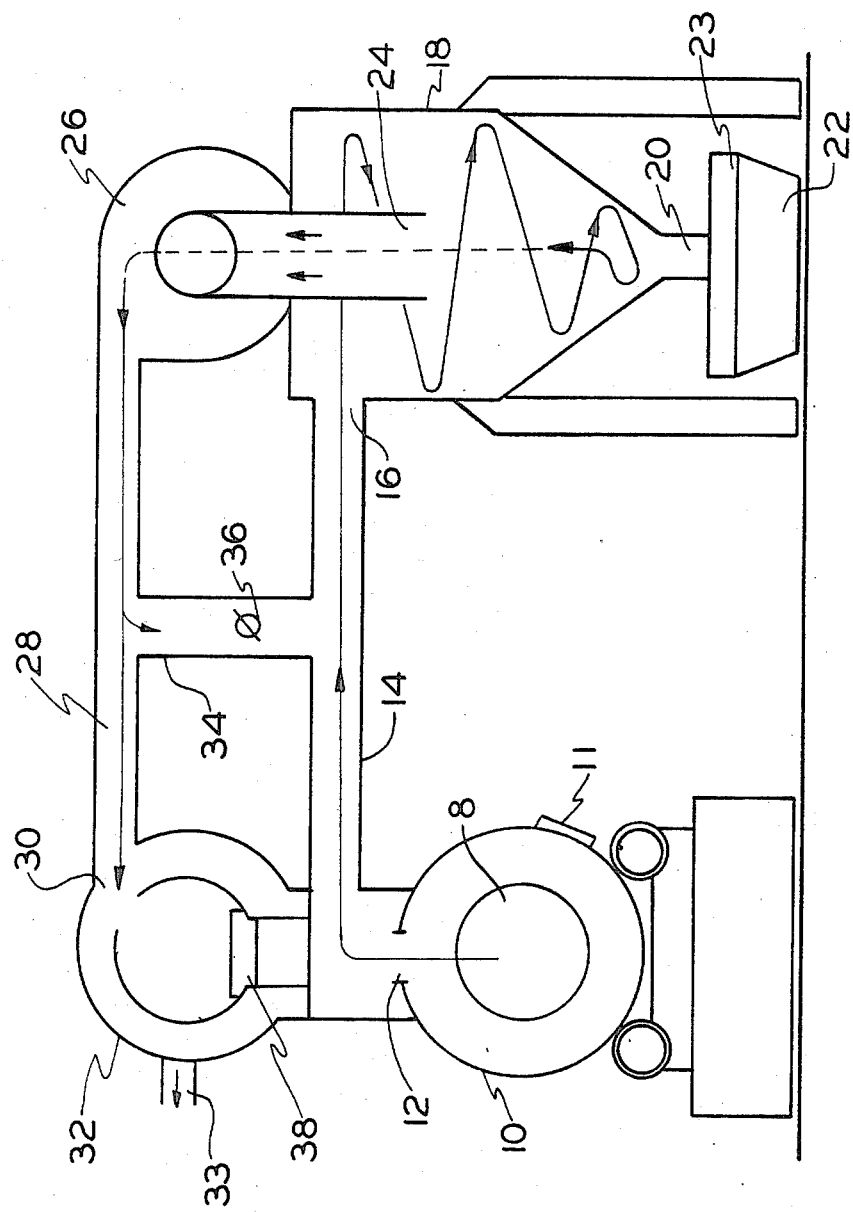

METHOD AND APPARATUS FOR SOIL DETOXIFICATION

BACKGROUND OF THE INVENTION

The present invention relates to a method and apparatus for detoxifying soil containing combustible toxic material.

Certain combustible toxic materials such as dioxin and PCB may be burned to create less harmful reaction products. Where soil has been contaminated with these combustible toxic materials, such soil must be heated to high temperatures, often in excess of 1200° C., in the presence of oxygen to combust the toxic materials and create less harmful reaction products.

Soils are composed of a mixture of organic and inorganic matter, the latter of which is generally the product of the weathering of rock. Metals and metallic compounds may also be present in the contaminated soil. The inorganic matter is primarily the mineral compounds of oxygen, silicon, aluminum, iron and calcium. Some of these mineral compounds and metals have melting points within the range of the extremely high temperatures needed to burn off toxic materials. Such heating of contaminated soil results in melting of the low melting point mineral and metal components. Typically the melted mineral components will form a mineral "fog" of tiny molten droplets in the high temperature regions of the apparatus used to burn the contaminated soil. Solidification of the mineral fog droplets on lower temperature walls and passageways of soiled detoxifying apparatus have caused numerous problems due to the buildup of glaze. This glaze buildup can cause numerous problems with maintenance and upkeep of the apparatus as well as problems in closing off passageways and openings within the apparatus.

It is therefore an object of the present invention to provide an improved method and apparatus for detoxifying soil containing combustible toxic materials.

It is another object of the present invention to provide a method and apparatus for detoxifying soil which reduces the buildup of glaze on the interior of the detoxifying apparatus.

It is a further object of the present invention to provide a method and apparatus for soil detoxification which reduces the maintenance requirements of the detoxifying apparatus.

SUMMARY OF THE INVENTION

The above and other objects which will be apparent to those skilled in the art are achieved by the present invention which comprises, in one aspect, a method of detoxifying soil containing low melting point material compounds contaminated with combustible toxic materials by heating the soil, without melting the low melting point mineral compounds, to form combusted solids and a mixture of mineral dust and toxic material-containing gas; separating the combusted solids from the dust-gas mixture; thereafter separating the mineral dust from the toxic-material containing gas; and combusting the toxic material-containing gas to form less harmful combustion products.

In another aspect, the present invention comprises an apparatus for detoxifying soil particles containing low melting point mineral compounds contaminated with combustible toxic materials comprising: an ignition chamber for heating the soil, without melting the low-melting point mineral compounds, to form combusted solids and a mixture of mineral dust and toxic material-containing gas, the ignition chamber having an inlet for the soil particles, a first outlet for the combusted solids, and a second outlet for the dust-gas mixture; means for separating the dust-gas mixture, the separating means having an inlet for the dust-gas mixture, a first outlet for the mineral dust, a second outlet for the toxic material-containing gas; a first passageway connecting the ignition chamber dust-gas outlet and the separating means inlet; a combustion chamber for combusting the toxic material-containing gas to form less harmful combustion products, the combustion chamber having an inlet for the toxic material containing gas and an outlet for the combustion products; and a second passageway connecting the separating means gas outlet and the combustion chamber inlet.

BRIEF DESCRIPTION OF THE DRAWINGS

The sole FIGURE illustrates a schematic diagram of the apparatus of the present invention.

DETAILED DESCRIPTION OF THE INVENTION

The present invention is useful in detoxifying a wide range of soils containing combustible toxic materials. The soils for which the present invention is especially useful are those which contain mineral compounds of oxygen, silicon, calcium, iron and aluminum. Of these groups, certain compounds melt at relatively low temperatures, e.g. silica ($SiO_2$) at about 1700° C., and calcium metasilicate ($CaSiO_3$) at about 1540° C. Certain metals may also be present when the soil as a sludge waste product, e.g. iron and its oxides, whose melting points are in the range of 1300° C. to 1750° C.

The combustible toxic materials which the present invention is especially useful in removing from the aforementioned soil are those which contain chlorine bearing compounds such as dioxin (2,3,7,8- tetrachlorodibenzo-p-dioxin) and PCBs (polychlorinated biphenyls).

The toxic materials, which may be liquid or contained in liquids at room temperature, are present in the soil between the soil particles or adsorbed onto the surfaces of the soil particles. These toxic materials may be rendered less harmful by heating in an oxygen containing atmosphere to above about 1200° C. so as to effect combustion whereby carbon dioxide and water are produced as the primary products of combustion. Any chlorine present may be converted to a salt (e.g., NaCl) in a conventional scrubber to render that product harmless.

Turning now to the FIGURE, the contaminated soil is first received through inlet 8 in ignition chamber 10 where it is heated in an oxygen-containing atmosphere, preferably air, to convert the toxic materials fully into a gaseous state, whether by volatilization or combustion or both, and to render the bulk of the solids into a noncombustible ash product. Such heating also serves to substantially desorb the toxic material from the surface of the soil particles. The preferred temperature in the ignition chamber is between about 350° C. and 500° C., although the temperature may range up to 750° C. The ignition chamber may be of the rotating type to tumble the toxic material-containing soil to facilitate heating. Such a rotary ignition chamber is disclosed in U.S. Pat. No. 3,861,335.

Upon being heated in ignition chamber 10 to the aforedescribed temperature range, the contaminated soil is decomposed and converted into a mixture of gases, which contain the volatilized and/or combusted toxic material, and solid non-combustible ash. The ash solids are removed from a solids outlet 11 in ignition chamber 10 for disposal by conventional means, such as in a land fill.

Typically, not all of the non-combustible solids may be so removed. Fine ash particles may become entrained in the ignition chamber gases as a mineral dust which mixes with the gaseous toxic materials. As used herein, "mineral dust" refers to fine particles of the aforedescribed mineral compounds and any metals present which are entrainable in a gas flow and which contain components having a melting point below about 1750° C.

As the toxic material-containing soil is processed in the ignition chamber 10, the mineral dust and gases are continuously removed from gas outlet 12 and carried throughout the various other stages by a gas flow created by the fan 26. After passage through an outlet 12 and through a first passageway 14, the dust-gas mixture is carried into the inlet 16 of a solid-gas separating device here pictured in its preferred embodiment as a centrifuge 18. The temperature of the dust-gas mixture at the centrifuge inlet 16 is substantially lower than its temperature at the combustion chamber outlet 12. The temperature at the centrifuge inlet 12 should be maintained high enough to avoid condensation and readsorption of the gaseous toxic materials onto the soil particles, preferably no lower than about 100°C.

Upon entering the cyclone centrifuge 18 the dust-gas mixture is carried downward in a fortex created by the flow of gas over the internal surface of the centrifuge. The solid particles in the mixture are carried toward the outer edges of the vortex and eventually flow downward along the sides into the solids outlet 20. The gas portion of the mixture is maintained at a predetermined flow velocity by the action of the fan 26 and is carried up from the bottom of the vortex through the center to the gas outlet 24. In a cyclone centrifuge, the gas flow velocity must be above a predetermined minimum in order for proper gas flow and separation to take place. For a typical cyclone centrifuge as illustrated here, the minuimum flow rate is about two (2) meters per second.

The solid material is collected in a receptacle 22 under the solids outlet 20 whereupon it is periodically removed and carried away. A cover 23 must be maintained about the solids receptacle to connect it to the cyclone solids outlet to prevent the infiltration of quantities of air which would interfere with the flow of the solids and gases within the cyclone 18. The gases, upon exiting through the cyclone gas outlet 24, pass through the fan 26 and into a second passageway 28 which leads to the afterburner chamber 32.

Upon entry into the combustion chamber 32 through inlet 30, the gases are subject to a temperature of at least about 1200° C. in the presence of atmospheric oxygen. The combustion chamber 32 is heated by an open flame, the temperature at the tip of which may reach as high as about 1550° C. to 1750° C. Conditions in the flame may also be slightly reducing, in contrast to the oxidizing conditions in the remainder of the combustion chamber.

At these temperatures the vaporized and/or partially combusted toxic materials are fully combusted to form carbon dioxide, $H_2O$ and chlorine contained gases. At these temperatures, also, certain mineral compounds or metals present with the gaseous toxic material may melt. The combustion products exit the combustion chamber 32 through an outlet 33 whereupon they are sent through conventional processing units (not shown), e.g., a baghouse and scrubber, for removal and conversion of any remaining harmful products.

A third passageway 34 connects the first and second passageways, 14 and 28, respectively, and contains flow control means here shown as a damper 36 to control the flow of gases therethrough. In the operation of the cyclone 18, it is necessary to maintain the aforementioned high flow velocity to properly separate the solids from the gases. In order to match the flow velocity requirements of the cyclone with the other system parameters, and to accommodate those periods where less than an optimal flow of dust-gas mixture is being removed from the iginition chamber 10, it is necessary to return a portion of the outflowing gases in the second passageway 28 through the third passageway 34 and back through the first passageway 14 into the cyclone inlet 16. Thus, a proper flow of velocity through the cyclone may be maintained at all times while the system operates at various dust-gas mixture flow rates.

The apparatus contains a bypass 38 between the ignition chamber 10 and the combustion chamber 32 which may be opened in the case of problems or other considerations to permit direct passage of the dust-gas mixture thereto. When the bypass is opened, portions of the mineral dust may enter the combustion chamber 32 and be melted, subsequently causing glazing problems therein.

As is apparent from the above description, the present invention operates so as to raise the temperature of the soil particles and the mineral dust to no greater than the melting point of the soil particle constiuents. In this elevated temperature range, which is sufficient to desorb the toxic materials of the soil, the soil particles and mineral dust are not given an opportunity melt and turn into a fog whereupon they may solidify upon the lower temperature walls of the apparatus as a glaze. Consequently, the maintenance and performance characteristics of the apparatus are greatly improved.

While this invention has been described with reference to a specific embodiment, it will be recognized by persons skilled in the art that variations are possible without departing from the spirit and scope of the invention and that it is intended to cover all changes and modifications disclosed herein for the purpose of illustration which do not constitute departure from the spirit and scope of the invention.

Having thus described the invention what is claimed is:

1. A method of detoxifying soil particles containing low melting point mineral compounds contaminated with combustible toxic materials comprising the steps of:
   (a) heating said soil particles, without melting said low melting point mineral compounds, to form combusted solids and a mixture of mineral dust and toxic material-containing gases;
   (b) separating said combusted solids from said dust-gas mixture;
   (c) conveying said dust-gas mixture in a gas flow to a location for separation and thereafter separating said mineral dust from said toxic-material containing gas; and
   (d) conveying a portion of the toxic-material containing gas to a combustion location while returning the remainder of said toxic-material containing gas to the gas flow containing the dust-gas mixture and thereafter combusting said toxic material-containing gas to form less harmful combustion products.

2. A method of detoxifying soil particles containing low melting point mineral compounds contaminated with combustible toxic materials comprising the steps of:

(a) heating and simultaneously tumbling said soil particles in an oxygen-containing atmosphere at a temperature below about 750° C., without melting said low melting point mineral compounds, to form combusted solids and a mixture of mineral dust and toxic material-containing gas;

(b) separating said combusted solids from said dust-gas mixture;

(c) conveying said dust-gas mixture in a gas flow to a location for separation and thereafter centrifuging said dust-gas mixture to separate said mineral dust from said toxic-material containing gases; and (d) conveying a portion of the toxic-material containing gas to a combustion location while returning the remainder of said toxic-material containing gas to the gas flow containing the dust-gas mixture and heating said toxic material-containing gas in an oxygen containing atmosphere to at least 1200° C. to combust said gas and form less harmful combustion products.

3. An apparatus for detoxifying soil particles containing low melting point mineral compounds contaminated with combustible toxic materials comprising:

an ignition chamber for heating said soil, without melting said low-melting point mineral compounds, to form combusted solids and a mixture of mineral dust and toxic material-containing gas, said ignition chamber having an inlet for said soil particles, a first outlet for said combusted solids, and a second outlet for said dust-gas mixture;

means for separating said dust-gas mixture, the separating means having an inlet for said dust-gas mixture, a first outlet for said mineral dust, and a second outlet for said toxic material-containing gas;

a first passageway connecting said ignition chamber dust-gas outlet and said separating means inlet;

a combustion chamber for combusting said toxic material-containing gas to form less harmful combustion products, said combustion chamber having an inlet for said toxic material containing gas and an outlet for said combustion products, a second passageway connecting said separating means gas outlet and said combustion chamber inlet, and a third passageway connecting said first and second passageways, said third passageway including flow control means for varying the flow of gas through said third passageway.

4. An apparatus for detoxifying soil particles containing low melting point mineral compounds contaminated with combustible toxic materials comprising:

an ignition chamber for heating said soil, without melting said low-melting point mineral compounds, to form combusted solids and a mixture of mineral dust and toxic material-containing gas, said ignition chamber having an inlet for said soil particles, a first outlet for said combusted solids, and a second outlet for said dust-gas mixture;

cyclonic centrifuge means for separating said dust-gas mixture, the separating means having an inlet for said dust-gas mixture, a first outlet for said mineral dust, and a second outlet for said toxic material-containing gas;

a first passageway connecting said ignition chamber dust-gas outlet and said separating means inlet;

a combustion chamber for combusting said toxic material-containing gas to form less harmful combustion products, said combustion chamber having an inlet for said toxic material containing gas and an outlet for said combustion products, a second passageway connecting said separating means gas outlet and said combustion chamber inlet, and a third passageway connecting said first and second passageways, said third passageway including flow control means for varying the flow of gas through said third passageway.

5. The apparatus of claim 4 wherein said flow control means comprises a damper.

6. An apparatus for detoxifying soil particles containing low melting point mineral compounds contaminated with combustible toxic materials comprising:

a rotatable ignition chamber for heating said soil, without melting said low-melting point mineral compounds, to form combusted solids and a mixture of mineral dust and toxic material-containing gas, said ignition chamber having an inlet for said soil particles, a first outlet for said combusted solids, and a second outlet for said dust-gas mixture;

a cyclonic centrifuge means for separating said dust-gas mixture, the centrifuge having an inlet for said dust-gas mixture, a first outlet for said mineral dust, a second outlet for said toxic material-containing gas;

a first passageway connecting said ignition chamber dust-gas outlet and said centrifuge inlet;

a combustion chamber for combusting said toxic material-containing gas at a temperature of at least 1200° C. to form less harmful combustion products, said combustion chamber having an inlet for said toxic material containing gas and an outlet for said combustion products;

a second passageway connecting said centrifuge gas outlet and said combustion chamber inlet; and a third passageway connecting said first and second passageways, said third passageway including flow control means for varying the flow of gas through said third passageway.

7. The apparatus of claim 6 wherein said flow control means comprises a damper.

* * * * *